(12) United States Patent
Hyde

(10) Patent No.: US 10,531,167 B2
(45) Date of Patent: Jan. 7, 2020

(54) ELECTRONIC MONITORING, SECURITY, AND COMMUNICATION DEVICE ASSEMBLY

(71) Applicant: RPH Engineering, LLC, Lehi, UT (US)

(72) Inventor: Ryan P. Hyde, Lehi, UT (US)

( * ) Notice: Subject to any disclaimer, the term of this patent is extended or adjusted under 35 U.S.C. 154(b) by 0 days.

(21) Appl. No.: 15/643,437

(22) Filed: Jul. 6, 2017

(65) Prior Publication Data

US 2018/0014093 A1 Jan. 11, 2018

Related U.S. Application Data

(60) Provisional application No. 62/359,160, filed on Jul. 6, 2016.

(51) Int. Cl.
  *H04Q 9/00* (2006.01)
  *H04W 84/12* (2009.01)
  *H04W 4/80* (2018.01)

(52) U.S. Cl.
  CPC ............ *H04Q 9/00* (2013.01); *H04Q 2209/43* (2013.01); *H04Q 2209/883* (2013.01); *H04W 4/80* (2018.02); *H04W 84/12* (2013.01)

(58) Field of Classification Search
  CPC .................. G05B 15/02; A61B 2560/0214
  USPC .................................................. 340/870.39
  See application file for complete search history.

(56) References Cited

U.S. PATENT DOCUMENTS

| | | | | |
|---|---|---|---|---|
| 6,452,484 B1* | 9/2002 | Drori | .................. | B60R 25/1004 340/425.5 |
| 2002/0011923 A1* | 1/2002 | Cunningham | ......... | H04B 3/542 340/12.32 |
| 2010/0156632 A1* | 6/2010 | Hyland | .................. | G08B 25/08 340/540 |
| 2011/0294382 A1* | 12/2011 | Puls | ...................... | B63C 9/0005 441/89 |
| 2014/0187889 A1* | 7/2014 | Cohen | ................ | A61B 5/14532 600/365 |
| 2014/0269477 A1* | 9/2014 | Snyder | .............. | H04W 52/0216 370/311 |
| 2014/0320312 A1* | 10/2014 | Sager | ....................... | H04Q 9/00 340/870.16 |
| 2015/0233596 A1* | 8/2015 | Warren | .............. | G05D 23/1902 700/278 |
| 2015/0339904 A1* | 11/2015 | Puskarich | .............. | G08B 17/11 455/556.1 |
| 2016/0100448 A1* | 4/2016 | Su | ......................... | H04W 74/02 370/328 |

(Continued)

*Primary Examiner* — Fabricio R Murillo Garcia
(74) *Attorney, Agent, or Firm* — Strong & Hanni, P.C.; Joseph Shapiro

(57) ABSTRACT

A method, system, and apparatus for security and monitoring are disclosed. In one embodiment, a small device with five sensors (temperature, light, motion, accelerometer, sound) includes a processor, local data storage, and WiFi and Bluetooth communication capabilities. The device may collect data through its sensors and may store such data on its local storage and/or may transmit such data to a remote monitoring server over WiFi (to a local router first over WiFi) and may also transmit data to a mobile device over Bluetooth. The mobile device and remote monitoring server may also configure the device. The device includes a power management scheme including heartbeats and minimized sampling rates.

16 Claims, 14 Drawing Sheets

(56) References Cited

U.S. PATENT DOCUMENTS

2016/0202127 A1* 7/2016 Chong .................. G01J 5/0896
                                                                                       374/121
2018/0156660 A1* 6/2018 Turgeon ................ G01J 1/4204

* cited by examiner

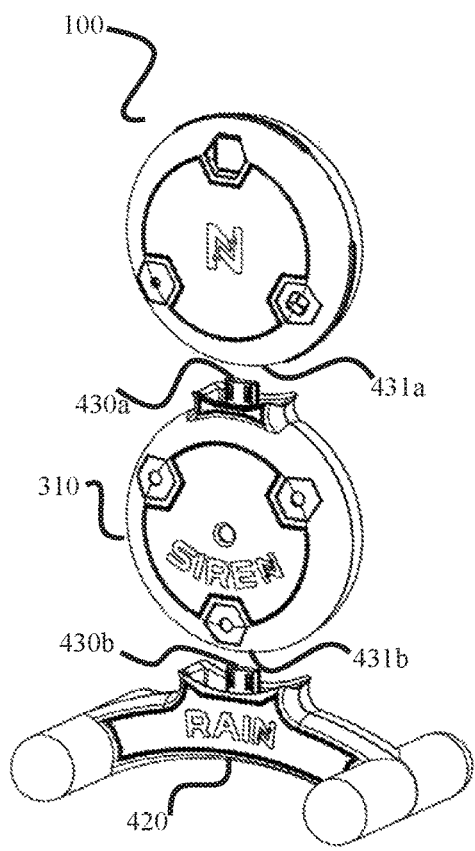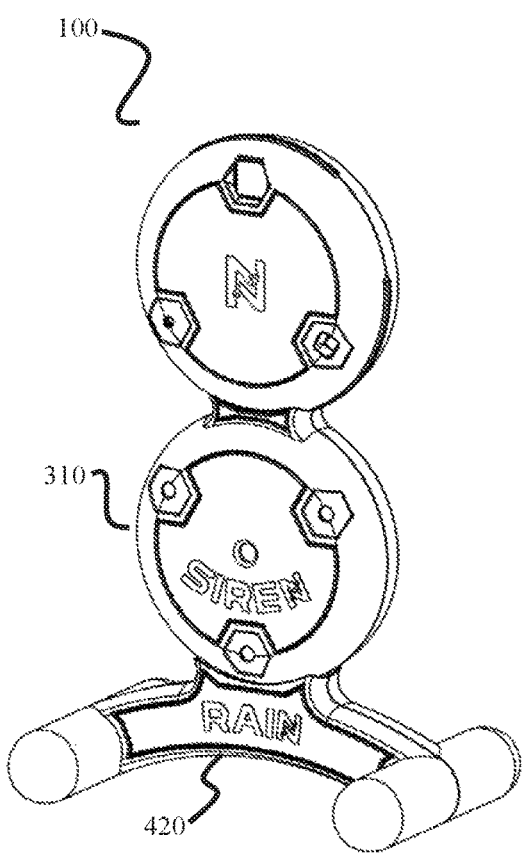
FIG. 12a  FIG. 12b

ELECTRONIC MONITORING, SECURITY, AND COMMUNICATION DEVICE ASSEMBLY

BACKGROUND OF THE INVENTION

Security and monitoring, in both residential and commercial applications, is important for maintaining security and protecting privacy and property. Unfortunately, current robust and scalable security and monitoring systems are expensive and complicated, requiring hardware, software, and monitoring services. In addition, currently available systems are complicated, requiring special knowledge and skill for setup. Also, some security and monitoring systems are too specialized, working for only one specific application, but lacking versatility.

What is needed is security and monitoring solution that is cost-effective, scalable, simple, and versatile.

BRIEF SUMMARY OF THE INVENTION

A security and monitoring device, apparatus, and methods are disclosed.

In one embodiment, a small battery-powered device may have multiple sensors, processing capability, local storage, wired and wireless communication components, and may be extensible. Such a device may be referred to as a Lynkd Device.

In one embodiment, sensors may include a temperature sensor, a light sensor, a motion sensor, an accelerometer, and a sound sensor.

In one embodiment, a Lynkd Device the device may include interface elements including but not limited to a button and lights.

A Lynkd Device may also include a power management scheme for extending battery life while still providing sufficient monitoring, processing, and communication services to constitute a viable and reliable securing and monitoring solution. In one embodiment, power management may include some or all of minimal sensor sampling, heartbeats for communication, and a battery with desirable features, e.g., a gradual discharge curve.

In one embodiment, a Lynkd Device may include Bluetooth capabilities for communicating with a mobile device for configuration information and/or sensor data.

A Lynkd Device may also include WiFi for communicating to a monitoring server through a local WiFi router.

A monitoring server may also be configured to collected data from a Lynkd Device, or to take action based on a notification from a Lynkd Device, or to configure a Lynkd Device, or to communicate with a mobile device regarding configuration for a Lynkd. Device or for data from a Lynkd Device.

BRIEF DESCRIPTION OF THE DRAWINGS

FIGS. 12*a* and 12*b* show an exemplary Moisture sensor extension device.

DETAILED DESCRIPTION OF THE INVENTION

This application claims priority to U.S. provisional application No. 62/359,160, titled "Embedded Electronic Monitoring, Security, and Communication Device Assembly," filed on Jul. 6, 2016, and which is incorporated herein by reference.

A device, system, and method are disclosed for use in security and monitoring applications. The device shall hereinafter be referred to as the Lynkd Device.

Figure 1:
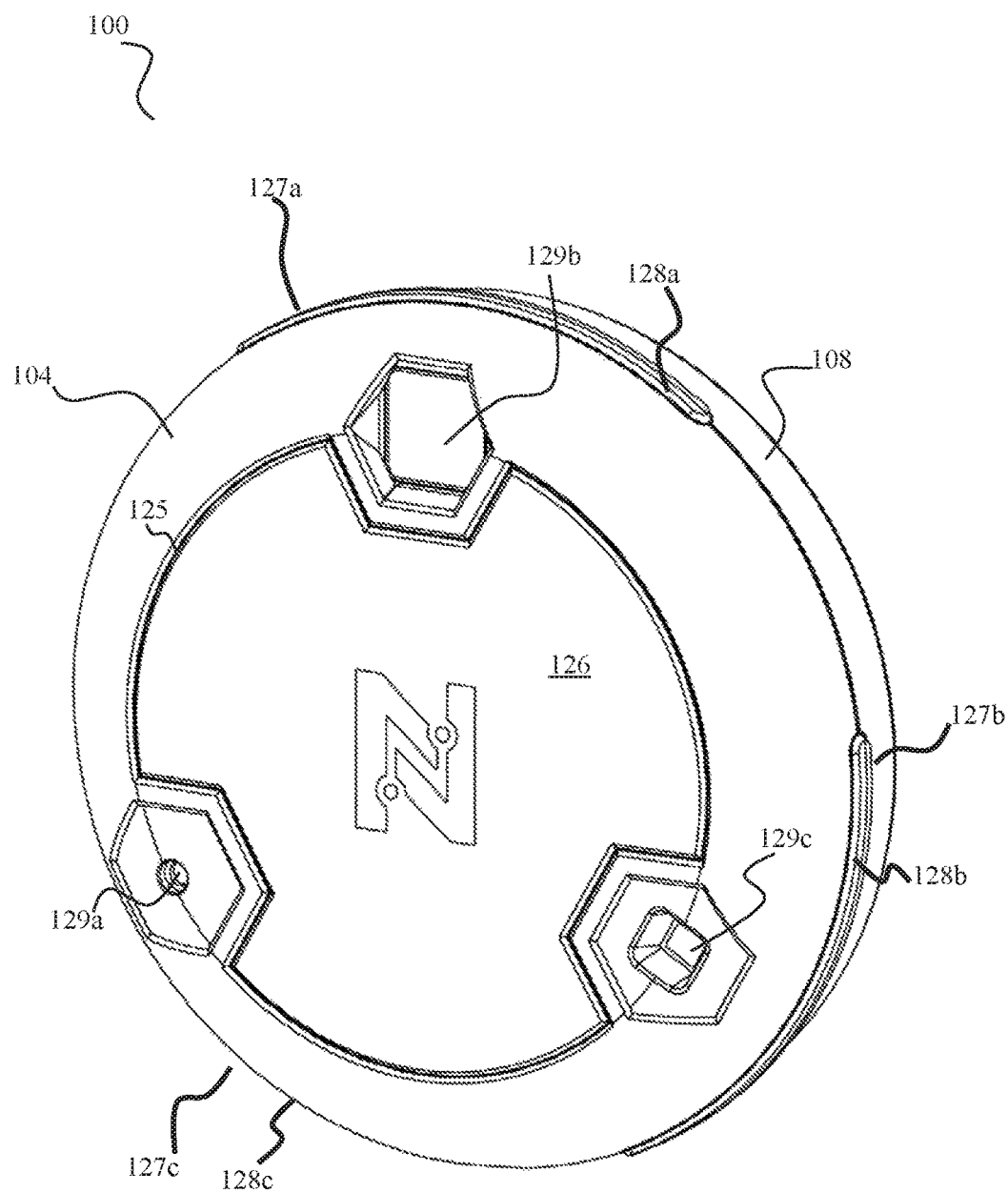
FIG. 1 illustrates an exemplary Lynkd Device.
Figure 2:
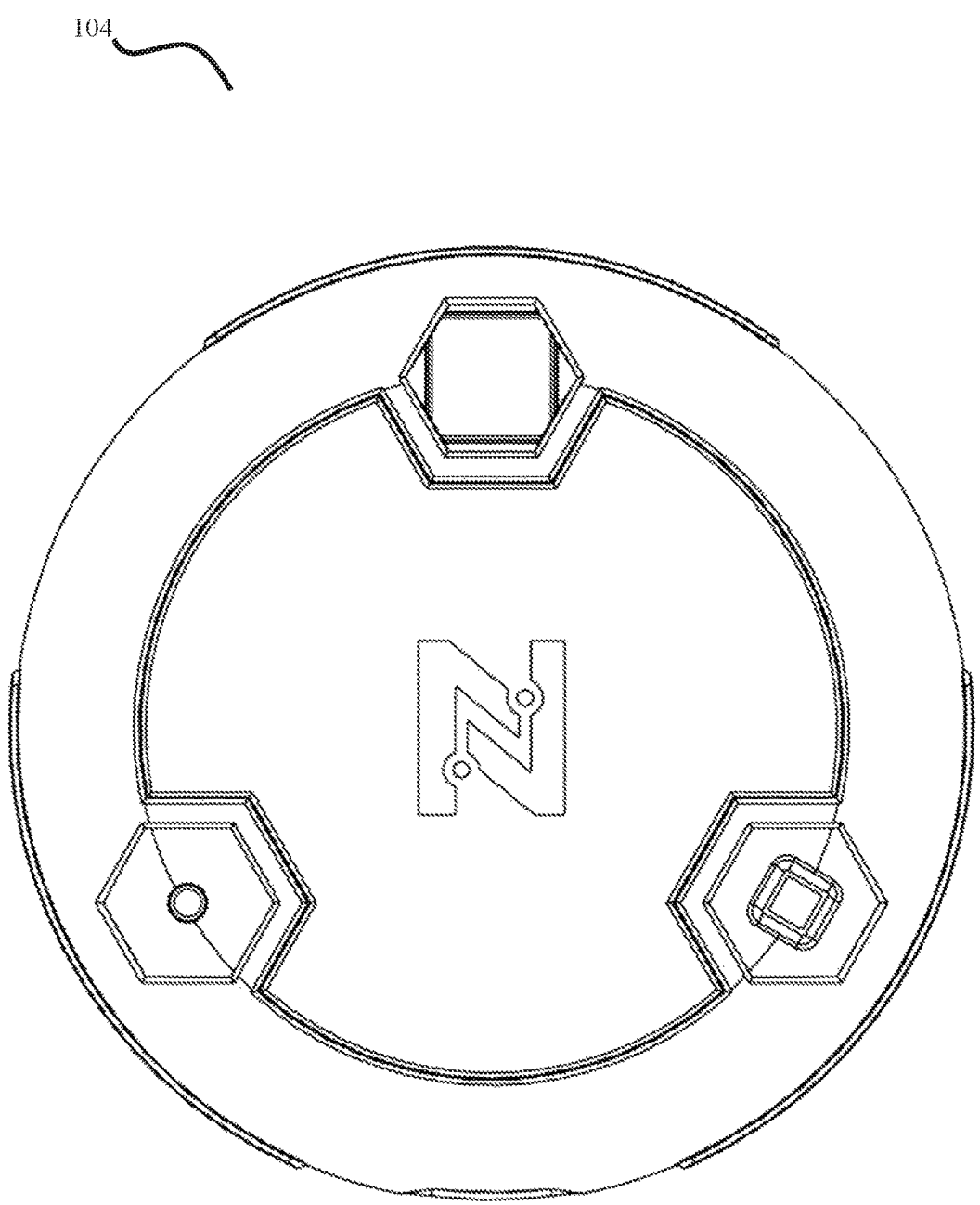
FIG. 2 provides a front view of an exemplary Lynkd Device.
Figure 3:
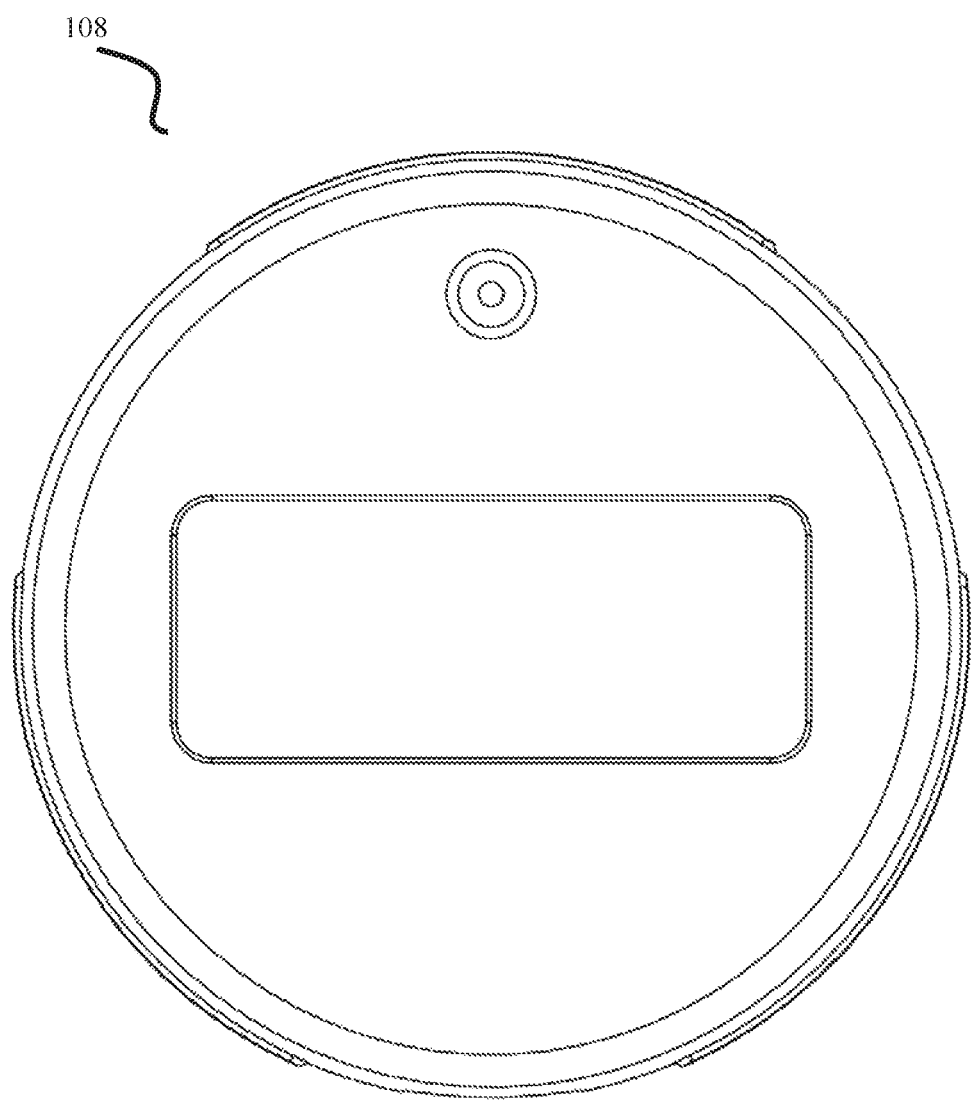
FIG. 3 provides a rear view of an exemplary Lynkd Device.
Figure 4:
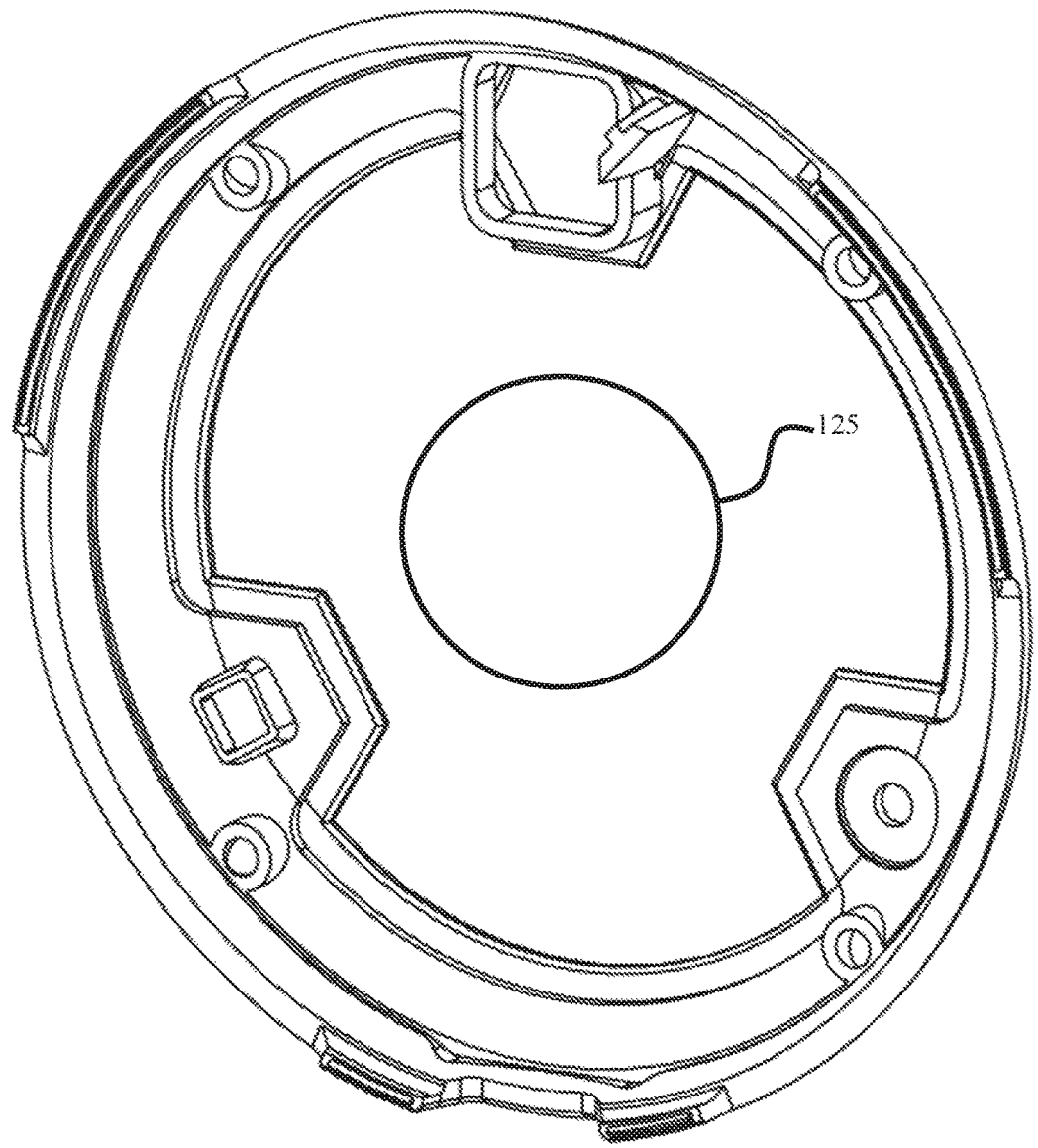
FIG. 4 shows the inside of the front of an exemplary Lynkd Device.

In a preferred embodiment, a Lynkd Device is a disk-shaped device as shown in FIG. 1. A Lynkd Device may have other three-dimensional shapes and two-dimensional profiles. As shown in FIG. 1, a disk-shaped Lynkd Device may have a circular profile with a diameter of approximately 1.925 inches, and may have a thickness of approximately 0.485 inches. As shown in FIG. 1, Lynkd Device 100 also has tapered edges. A person of ordinary skill in the art will appreciate that a Lynkd Device may have many shapes and sizes, which may result from aesthetic requirements, positioning and organization of components inside a Lynkd Device 100, cost of components inside a Lynkd Device 100 (in general, cost increases as size decreases), battery size and power needs, and application (e.g., a Lynkd Device designed for a cylindrically-shaped space may have a cylindrical shape, and a Lynkd Device designed for a rectangular-prism-shaped space may have a rectangular-prism shape). In general, based on component availability, component cost, component size, other component characteristics (e.g., orientation requirements), application requirements, and other factors which will be apparent to a person of ordinary skill in the art, a Lynkd Device may have many different shapes and sizes without departing from the spirit of the disclosure herein.

Lynkd Device 100 may comprise an exterior shell, a sensor system, a communication system, and an interface system.

In one embodiment, the exterior shell may comprise a front shell 104 and a back shell 108, which may be secured to each other with a screw/threaded securement. Front shell 104 may be secured to back shell 108 in any way known in the art, including but not limited to screws, clasps, clamps, and other devices, hardware, or solutions for securing components to each other.

In general, front shell 104 and/or back shell 110 may be formed from any material, or composition of materials, that may house a PCB and other electronics, and that may further house or support one or more interface elements and/or accesses to interface elements such as ports, lights, and apertures or accessibility features for sensors. In one embodiment, the material for front shell 104 and/or back shell 108 may be stronger, thicker, or more rigid to protect its contents. In another embodiment, the material for front shell 104 and/or back shell 108 may be a material which can be adhered to an item such as a window or door, e.g., by sticking with removable/non-permanent adhesive, secured to any item in any other manner known in the art. A person of ordinary skill will recognize that possible materials for the shell include, but are not limited to, metals and plastics. The exterior shell may be weatherproof or waterproof.

In a preferred embodiment, front shell 104 and back shell 108 are monolithic, but they could be formed from multiple sub-parts based on various factors that may be amenable to such construction.

In some embodiments, the exterior shell may also be flexible or pliable, e.g., made form a rubber or soft plastic material.

It should be appreciated that although the figures provided with this disclosure, along with this disclosure, refer to and illustrate an exterior shell formed from two distinct components by virtually slicing the disk-shaped Lynkd Device 100 in half along its length, other approaches for separating a Lynkd Device into one or more parts may be applied, e.g., a hinged opening, or a hatch opening, and many others within the abilities of a person of ordinary skill.

Front shell 104 may further comprise one or more apertures to make accessible or reveal one or more interface elements as may be described herein below. For example, in one embodiment, front shell 104 may include aperture 125 for making accessible a button 126 or similar interface element. Front shell 104 may further include apertures 127*a*, 127*b*, and 127*c* to facilitate the visibility of lights 128*a*, 128*b*, and 128*c*. Front shell 104 may further include apertures 129*a*, 129*b*, and 129*c* for making accessible sensors such as a microphone, light sensor, and/or motion detector. Depending on various requirements or factors, shell 110 may comprise apertures of various sizes, shapes, locations, and orientations to facilitate access to interface elements. It should be appreciated that one or more such apertures could be located on back shell 108 or could even straddle the seam between front shell 104 and back shell 108.

Figure 8:
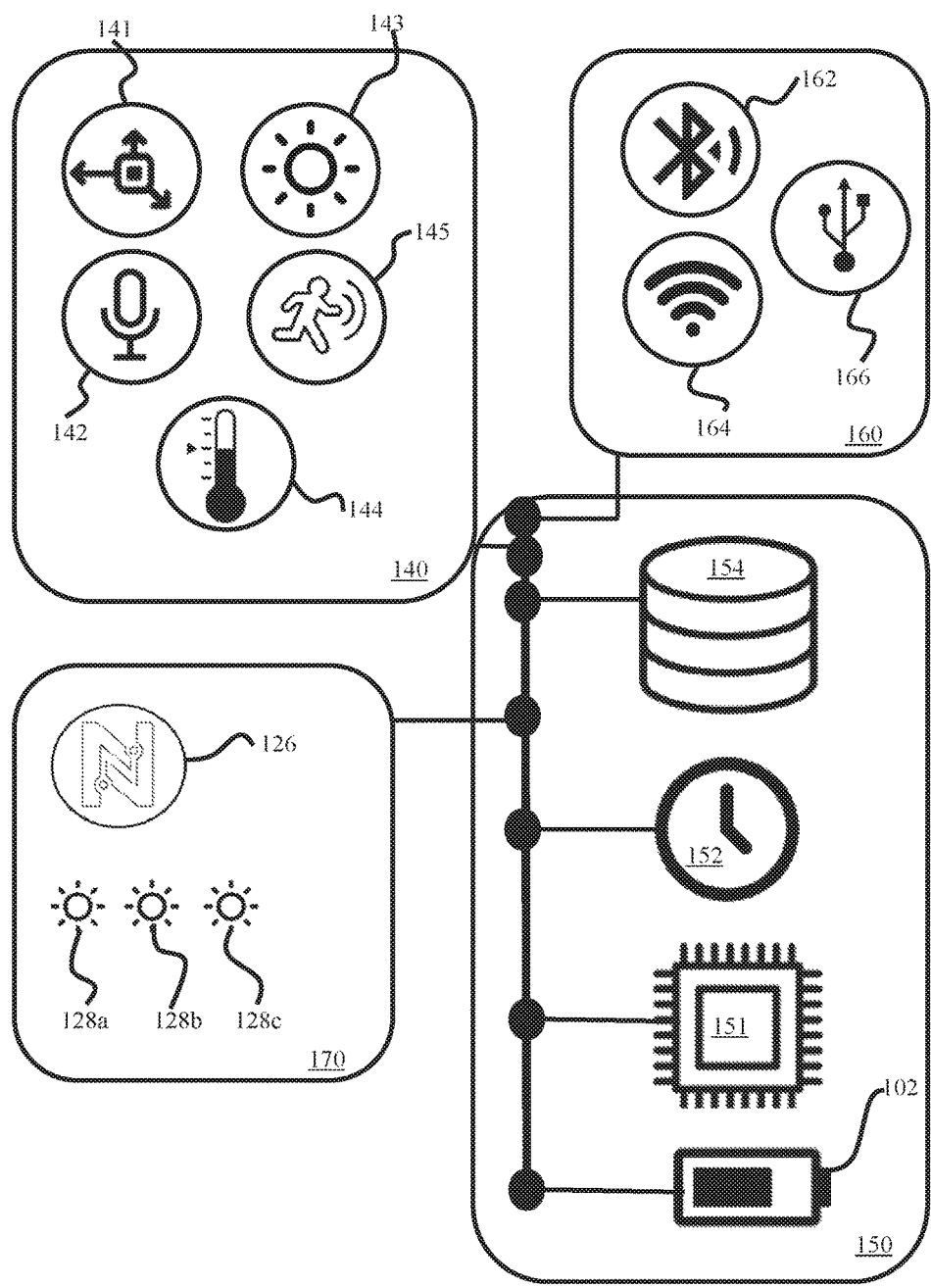
FIG. 8 shows a conceptual view of a Lynkd Device.

In a preferred embodiment, and as illustrated conceptually in FIG. 8, sensor system 140, communication system 160, and interface system 170, and the components thereof, will be connected, powered, and otherwise linked using a printed circuit board (PCB) 150. The components of these systems may be connected directly to PCB 150, or may be chained or indirectly connected, or may otherwise be connected for communication and/or power management as will be appreciated by a person of ordinary skill in the art.

PCB 150 may include, or may be connected to, a local clock 152 and local data storage 154. Local clock 152 may comprise any clock solution, many of which are known in the art. Local data storage 154 may comprise any data storage technology, many of which are known in the art. In one embodiment, local data storage 154 may be Flash. A person of ordinary skill will appreciate that many storage solutions and technologies, and variants thereof, are available and well-known and that many different types of local data storage could be used.

PCB 150 may further include, or be connected to, a processor 156. PCB 150 may further include instructions for processor 156. These instructions may be stored in hardware, software, firmware, or any other solution known in the art for storing instructions for a processor.

Lynkd Device 100 may comprise a sensor system 140 for sampling and sensing various environmental characteristics, including but not limited to: movement, acceleration, orientation, noise, light, temperature, image, video, moisture, and humidity. The sensors for collecting the data to generate these environmental characteristics may include an accelerometer 141, a sound/noise sensor (microphone) 142, a light sensor 143, a temperature sensor 144, a motion sensor 145, and other sensors not shown in FIG. 8, including but not limited to a camera, a video camera, a moisture sensor, a humidity sensor, and any other sensor, many of which are known in the art and widely available.

In one embodiment, sensor system 140 may comprise accelerometer 141, microphone (or noise/sound detector) 142, light detector 143, temperature sensor 144, and infrared motion sensor 145. Depending on requirements, constraints, or characteristics of a particular application, sensor system 140 may include more or less sensors of different varieties and functionality, or different groupings of sensors in the same Lynkd Device.

In one embodiment, sensors 141-1445 may be laid out, organized, and oriented on or connected to PCB 150. A person of ordinary skill will appreciate that a PCB may be laid out in many different ways, and that components may be positioned and laid out in many different ways, without departing from the spirit of the disclosure herein.

Accelerometer 141, when activated, may collect data relating to the direction of movement, speed of movement, acceleration of movement, and orientation of Lynkd. Device 100. Data collected from accelerometer 141 may be stored in data storage 154, or may also be stored, in whole or in part, in other volatile or non-volatile data storage solutions on or connected to PCB 150, as are known in the art. As is known in the art, data from accelerometer 141 may be processed by processor 151 to determine direction of movement, speed of movement, acceleration of movement, and orientation of Lynkd Device 100. The results of the processing of data from accelerometer 141 may be stored in local data storage 154, stored in different storage on or connected to PCB 151, and/or may be transmitted as described herein below.

Microphone 142, when activated, may collect data sound and noise signals. Microphone 142 may be accessible to sound outside front shell 104 through aperture 129*b*, or alternatively through a semi permeable membrane materials, or through a thin shell. Data collected from microphone 142 may be stored in data storage 154, or may also be stored, in whole or in part, in other volatile or non-volatile data storage solutions on or connected to PCB 150, as are known in the art. As is known in the art, data from microphone 142 may be processed by processor 151 to determine volume, direction, and other characteristics of noise or sound. The results of the processing of data from microphone 142 may be stored in local data storage 154, stored in different storage on or connected to PCB 151, and/or may be transmitted as described herein below.

Light detector 143, when activated, may collect light data and signals. Light detector 143 may be exposed to outside light through aperture 129*a*. Many light detectors are known in the art and widely available. Data collected from light sensor 143 may be stored in data storage 154, or may also be stored, in whole or in part, in other volatile or non-volatile data storage solutions on or connected to PCB 150, as are known in the art. As is known in the art, data from light detector 143 may be processed by processor 151 to determine light characteristics such as strength. The results of the processing of data from light detector 143 may be stored in local data storage 154, stored in different storage on or connected to PCB 151, and/or may be transmitted as described herein below.

Temperature sensor 144, when activated, may collect temperature data. Many viable temperature sensors are well-known and wide available. Data collected from temperature sensor 144 may be stored in data storage 154, or may also be stored, in whole or in part, in other volatile or non-volatile data storage solutions on or connected to PCB 150, as are known in the art. As is known in the art, data from temperature sensor 144 may be processed by processor 151 to determine light characteristics such as strength (any other light characteristics that LYNKD may detect). The results of the processing of data from temperature sensor 144 may be stored in local data storage 154, stored in different storage on or connected to PCB 151, and/or may be transmitted as described herein below.

As described herein above, sensor system 140 may comprise many different sensors, or sets of such sensors, as are well-known in the art. Other sensors may include, but are not limited to, visual image, heat image, video, humidity, moisture, and pressure.

Lynkd Device 100 may also include a communication system 160. Communication system 160 may comprise one or more subsystems to transmitting and receiving data from or to Lynkd Device 100.

In one embodiment, communication system 160 may include Bluetooth system 162, WiFi system 164, and wired communication system, e.g., I²C, 166. Chips, hardware, adapters, interfaces, and radios (as necessary) are widely available for these and many other communication technologies.

Bluetooth system 162 may comprise a Bluetooth radio chip communicably connected to PCB 150. A person of ordinary skill will appreciate that many such chips have been developed and are widely available.

Win system 164 may comprise a WiFi radio chip communicably connected to PCB 150. A person of ordinary skill will appreciate that many such chips have been developed and are widely available.

Wired communication system 166 may comprise hardware, software, firmware, and/or any other adapters or chips for implementing such technology and protocol. A person of ordinary skill will appreciate that many such solutions have been developed and are widely available.

In one embodiment, wired communication system 166 may use USB, or micro USB hardware and adapters for wired connections, even though a distinct protocol, e.g. I²C, is used for the communications. USB hardware is widely available and inexpensive.

Communication system 160 may include modules, chips, software, hardware, firmware, radios, and other components for one or more other communication protocols, e.g., RFID, ZWave, and/or any other proprietary or non-proprietary communication protocol.

As described herein elsewhere, communication system 160 may transmit data collected from sensor system to exterior devices and/or servers, and/or may receive configuration data or instructions from exterior devices and/or servers.

Lynkd Device 100 may also include interface system 170 as shown conceptually in FIG. 8, which may comprise interface elements and/or controls for interfacing directly with Lynkd Device 100. In one embodiment, Lynkd Device 100 may comprise button 126 and lights 128*a-c*. Button 126 and lights 128*a-c* may be communicably connected to PCB 140, so that processor 151 can is able to receive input from button 126 and control lights 128*a-c*. Techniques, hardware, software, components, and other approaches are well-known in the art for receiving input from a button and for controlling lights.

Interface system 170 may further include other interface controls, elements, or subsystems, including but not limited to, voice control, additional buttons, additional lights, tapping/knocking control (using accelerometer 141), and any other interface control solutions known in the art. Interface system may also include, e.g., a display, or bell, siren, tone, or device for playing other sounds or noises.

Figure 5:
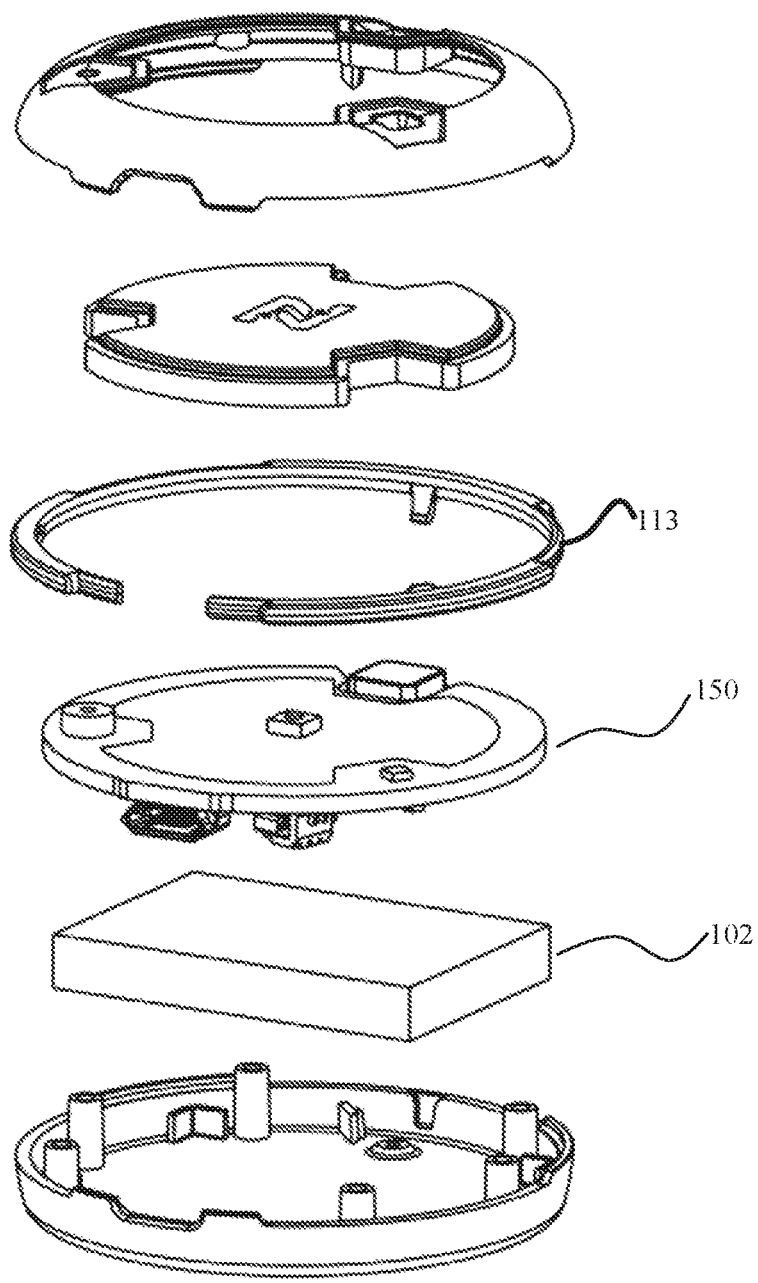
FIG. 5 shows an exploded view of an exemplary Lynkd Device.
Figure 6:
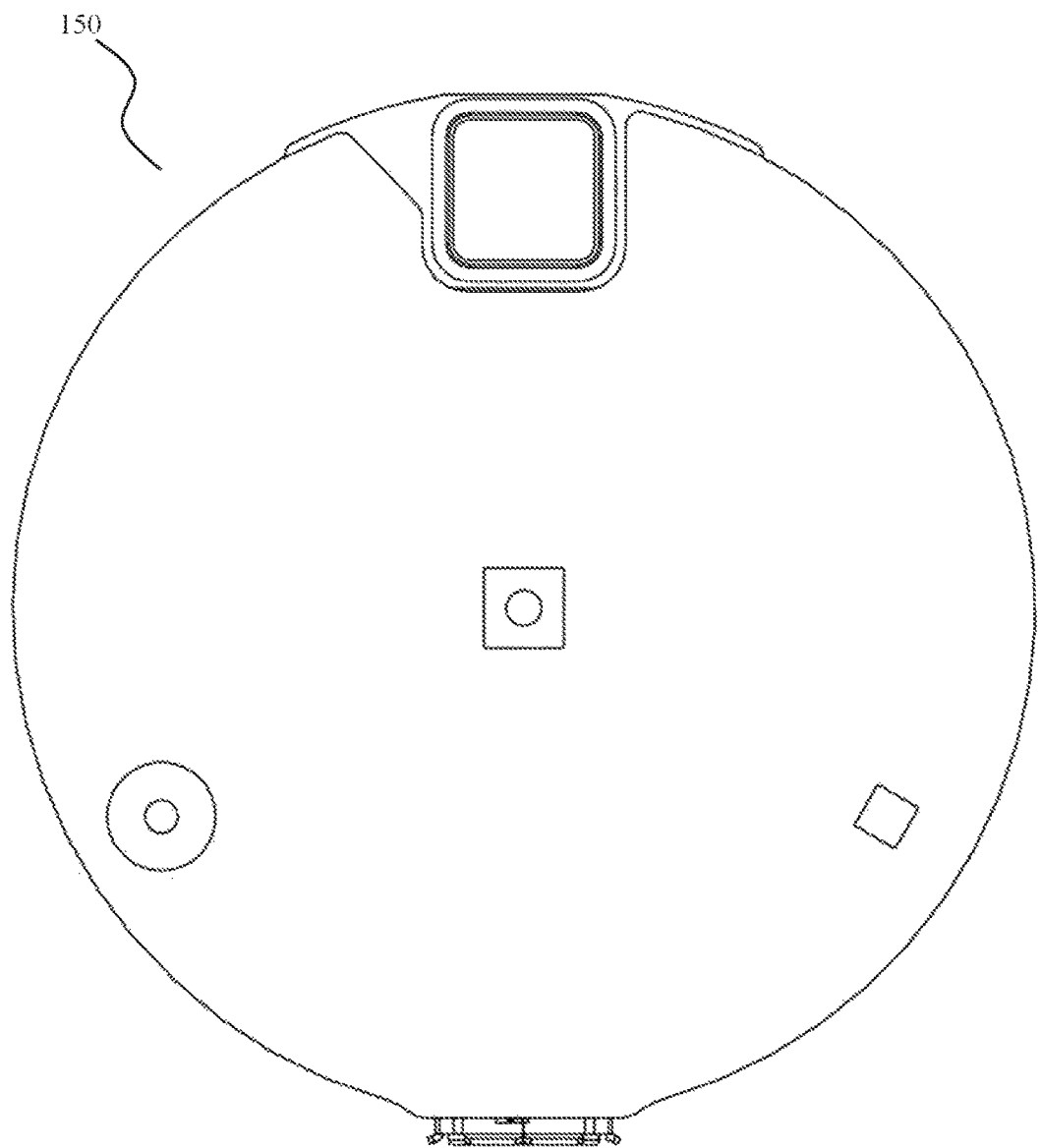
FIG. 6 shows the front of a PCB for an exemplary Lynkd Device.
Figure 7:
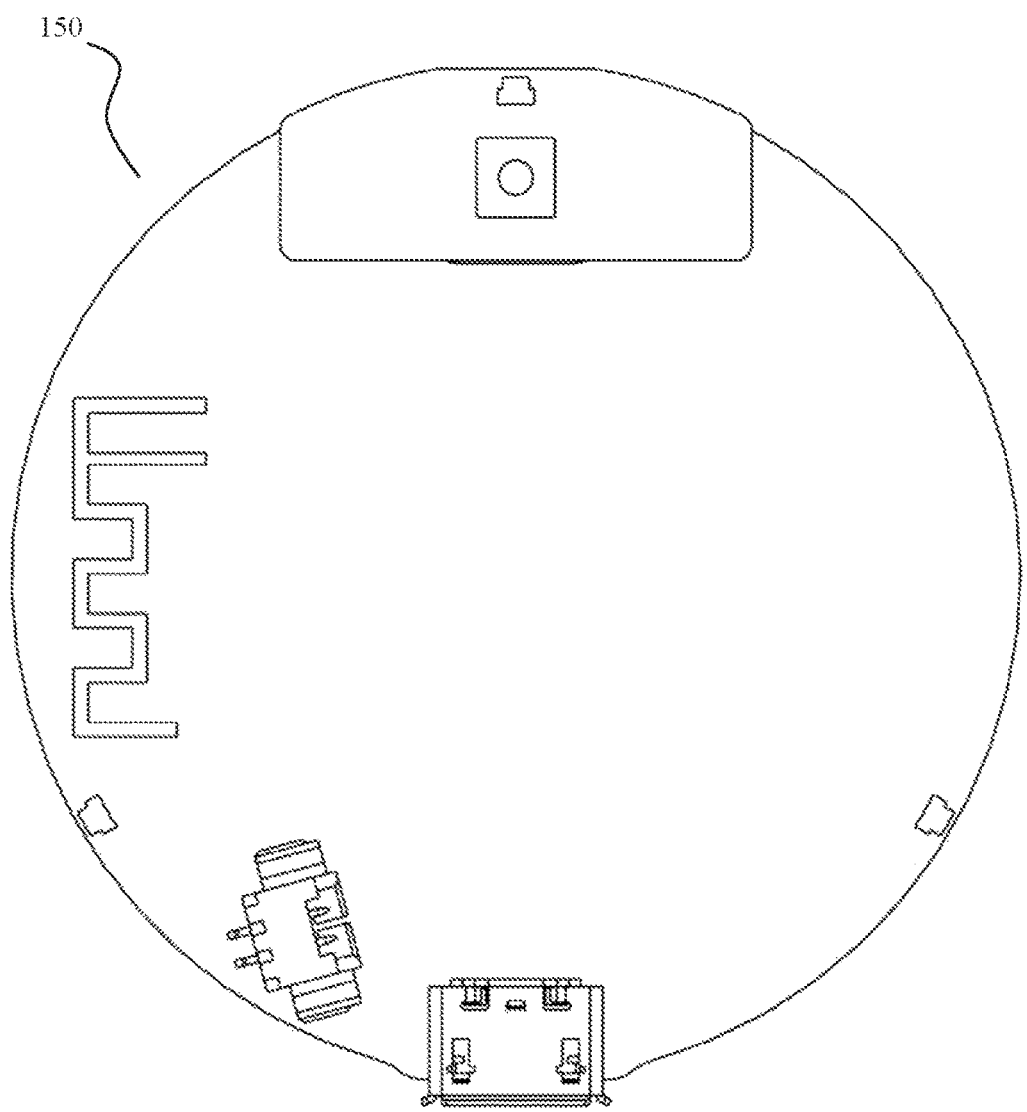
FIG. 7 shows the back of a PCB for an exemplary Lynkd Device.

In a preferred embodiment, Lynkd Device 100 is powered by battery 102 as shown in FIG. 5. In a preferred embodiment, battery 102 may be a 400 mAh rechargeable lithium ion battery. As will be appreciated by a person of ordinary skill increased battery size will generally resulted in increased battery life. In general, the size of battery 102 will be limited at least by the size of Lynkd Device 100 because battery 102 must fit inside Lynkd Device 100. Battery 102 may be placed and secured inside Lynkd Device 100, and between front shell 104 and back shell 108, as shown in FIG. 8.

The Lynkd Device may include computer readable instructions, stored either in local data storage 154, or in firmware communicatively connected to PCB 150, or in hardware communicatively connected to PCB 150, or in any other storage solution known in the art for storing computer readable instructions.

These instructions may be processed by processor 151 to carry out any or all or a subset of the functions or methods described below.

In one embodiment, instructions 200 may include instructions for tamper monitoring. For tamper monitoring, instructions 200 may elicit and/or receive data from accelerometer 141 and may process such data to identify movement, bumping, shaking, and other types of movement. Algorithmic approaches are well known in the art for processing accelerometer data to analyze movement history or features of an object. In one embodiment, Lynkd Device 100 may determine that it has been bumped, shaken vigorously shaken, shaken for a particular amount of time, moved, moved at a particular speed or speeds, moved at a particular acceleration or accelerations, moved along a particular path, moved for a particular amount of time, or any other data that may be ascertained by analyzing accelerometer data.

Depending on the application, Lynkd Device 100 may determine that movement above or below predetermine thresholds are irrelevant for the application, but that other movement parameters require responsive action. For example, movement less than a certain distance, or for less than a certain amount of time, or at less than a certain speed, may be insignificant, but movement over such thresholds may require or result responsive action.

For example, Lynkd Device 100 could be secured to a window, door, or car and could use tamper monitoring. In the window example, Lynkd Device 100 may be configured (based on instructions), to detect accelerometer data to identify movement. When move is greater than de minimis, e.g., more than 1 cm, Lynkd Device 100 may determine that a window has opened, closed, or become more open or more closed, and may take responsive action. In one embodiment, Lynkd Device 100 could be configured to make a noise, e.g., a bell, tone, or siren, when Linkd Device 100 determines that a window has moved, i.e., opened or closed. In another example, Lynkd Device 100 may be configured to transmit a notification to an external device or server, as will be described herein below, notifying such external device that a window has opened or closed or that its state has somehow been changed, or that it has been broken.

In another example, Lynkd Device 100 could be secured to a door. In this example, Lynkd Device may be configured to operate similarly to the operation described above for the window.

In another example, Lynkd Device 100 could be secured to a car, or a car door, or to any other item. If Lynkd Device 100 determines based in whole or in part on data from accelerometer 141 that Lynkd Device has moved, or moved greater than a certain distance, or moved at greater than a certain speed, Lynkd Device 100 may initiation action such as making a noise or transmitting a notification to an external device over communication system 160. For example, a Lynkd Device secured to a car or bicycle may make a noise or notify an external device if processor 151 determines that the car or bicycle is moving without authorization and my, therefore, be being stolen.

In another embodiment, instructions 200 include instructions for temperature monitoring. For example, Lynkd Device 100 may be placed in, or secured at, location to monitor temperature, such as in a residence, automobile, or industrial application. For temperature monitoring, instructions 200 may elicit and/or receive data from temperature sensor 144 and may process such data to identify current temperature and/or changes in temperature. Technologies and approaches for receiving data from a temperature sensor and transforming such data into use temperature data, e.g., Fahrenheit or Celsius temperatures, are well-known in the art.

Based on the current temperature, or change in temperature, or temperature fluctuations, or speed of change in temperature, Lynkd Device 100 may determine to initiate some action, e.g., making a noise or notifying an external device. Exemplary applications may including providing temperature information to residential and/or commercial climate control systems, monitoring temperature to identify an abnormal, unexpected, unacceptable, or undesirable circumstance such as in increase or decrease in temperature indicating that a climate control system is functioning properly, or a temperature, e.g., inside a car, indicating that it is dangerous for a person to be inside a car, or a temperature circumstance in a factory or on industrial setting indicating that action is necessary (e.g., changing a filter) or that an abnormal condition has arisen, or that a cooling or heating process is progressing.

In another embodiment, instructions 200 may include instructions for light monitoring. For example, Lynkd Device 100 may be placed in, or secured at, a location to monitor light conditions, such as in a residence, office building, or other environment where lighting is significant or may be indicative of a significant or otherwise noteworthy or reportable condition. For light monitoring, instructions may elicit and/or receive data from light detector 143 and may process such data to identify current light conditions and/or changes in lighting. Technologies and approaches for receiving and processing data from a light detector are well-known in the art.

Based on current lighting conditions, or changes in lighting conditions, Lynkd Device 100 may determine to initiate some action, e.g., making a noise or notifying an external device. Exemplary applications may include determining if a light has been turned on, or if an external or unexpected lighting source has been applied, or if there is a fire, or if a door or window coverings have been opened or closed, or any other condition that may be related to or a function of lighting conditions.

Based on the current lighting conditions, or change in lighting conditions, or lighting fluctuations, or speed of change in lighting, Lynkd Device 100 may determine to initiate some action, e.g., making a noise or notifying an external device. Exemplary applications may including determining when a door or window is open or closed, or when a light has been turned on, or any other application that may involve changes in lighting conditions.

In another embodiment, instructions 200 may include instructions for sound/noise. For example, Lynkd Device 100 may be placed in, or secured at, a location to monitor sound, such as in a residence, where increased sound levels may indicate an intruder, or that a baby has woken up or is otherwise crying, or any other condition that may be related to sound, volume, or fluctuations in sound.

For sound monitoring, instructions may elicit and/or receive data from microphone 142 and may process such data to identify current sound/noise conditions, including but not limited to volume, and fluctuations in sound. Technologies and approaches for receiving and processing data from a microphone are well-known in the art.

Based on current sound conditions, or fluctuations in sound conditions Lynkd Device 100 may determine to initiate some action, e.g., making a noise, or blinking or showing a light, or notifying an external device. Exemplary applications may include identifying intrusions, identifying waking up or crying babies, or any other condition which may relate to sound.

In another embodiment, instructions 200 may include instructions to use WiFi system 164 to track or provide updates on the location of Lynkd Device 100. In one embodiment, Lynkd Device 100 may periodically transmit and/or receive a WiFi pulse to or from a WiFi router with a fixed location. If Lynkd Device 100 is unable to receive a WiFi signal from a particular WiFi router, Lynkd Device 100 may determine that it is outside of a WiFi geo fence, i.e., it is outside of the geographic area in which it is near enough to the WiFi router to receive a signal from the WiFi router. In this embodiment, upon determination that Lynkd Device 100 is within, or outside of, or has entered, or has exited a WiFi geo fence, Lynkd Device 100 may initiate an action, e.g., turning on or off one or more of lights 128*a-c*, or making a noise, or transmitting a notification to an external device over communication system 160. Even if Lynkd Device 100 has exited a geo fence associated with a particular WiFi router, it may notwithstanding be within range of one or more different WiFi routers, and may thereby transmit a notification through a different WiFi router, or over Bluetooth system 162, or over any other subsystem of communication system 160.

In another embodiment, Lynkd Device may provide notifications to an external device over communication system 160 as Lynkd Device moves in and out of range of WiFi routers with known fixed locations, thereby allowing the Lynkd Device to effectively be tracked as to location. Either the particular WiFi router may disclose its fixed known location to Lynkd Device 100, which may then report such location to an external device, or Lynkd Device 100 may notify an external device of an identifier, e.g., MAC or IP address, of an WiFi router, and the external device may look up the fixed known location associated with such WiFi router. Using this approach, an external device may track the location of Lynkd Device 100, or track the progress of Lynkd Device 100 toward a particular destination. Applications include, but are not limited to, securing a Lynkd Device 100 to a dog (e.g., on the dog's collar) and then tracking the dog's location to determine that a dog has escaped, determining that a child (with a Lynkd Device) has arrive home from school and providing a notification to a parent or other interested party or caregiver, or otherwise tracking location or progress of any item.

In another embodiment, instructions 200 may include instructions for notifying that an emergency situation has occurred when button 126 is pressed, or pressed in a pre-defined pattern (e.g., a rapid press-press-press), or when button 126 has not been pressed for a pre-defined period of time. For example, an elderly person may wear, carry, or otherwise keep in an accessible manner a Lynkd Device. If the elderly person falls and cannot get up, or is injured, or is otherwise in a situation requiring assistance, the elderly person may press button 126, or may press button 126 in a pre-defined pattern. Upon determination that button 126 has been pressed, or has been pressed in the pre-defined pattern, Lynkd Device 100 may transmit, over communication system 160, a notification to an external device, which may then notify a caregiver or other party of the elderly person's need for assistance.

In another embodiment, a Lynkd Device 100 may be used to monitor the well-being of a person by monitoring motion or movement of the person (as described herein above) or by requiring the user or wearer of a Lynkd Device 100 to periodically press button 126. If Lynkd Device 100 fails to identify or report movement or a button press for a predetermined period of time, then Lynkd Device 100 may notify an external device that the user/wearer of the device may be in trouble or may need a well-being check. Alternatively, an external device could receive reports on movement or button presses from Lynkd Device 100, and could determine some action to take if a predetermined period of time passes without reported movement or a button press.

Power Management

Because Lynkd Device 100 is not connected to a perpetual power source, e.g., an power outlet, it is powered by an on-board power supply—battery 102. As described above, battery 102 may be a rechargeable lithium ion 400 mAh battery. Because of the desirability of maximizing battery life, and minimizing the requirements for replacing and/or recharging batteries, one or more power management solutions may be employed to conserve battery life. In one embodiment, the PCB may include power management circuitry to enable activation and de-activation of the components described herein, e.g., sensors sensor system 140, and radios, antennas and other power-consuming components of communication system 160.

Power management may be significant and even crucial because of the consequences of a non-functioning Lynkd Device (e.g., does not detect intruders because battery is depleted) and also because of the inconvenience of charging a Lynkd Device. In short, prolonged battery life resulting from battery technology, power management approaches, or any solution, increases battery life and time between recharges.

In one embodiment, a battery with a gradual discharge curve may provide power management benefits. In general, a gradual discharge curve means that as a battery approaches depletion, its voltage, which may be sampled, gradually decreases, thereby allowing a processor or other component to predict battery life with greater accuracy than for a steeper discharge curve. With a steeper discharge curve, which in some applications and with some batteries have has a virtual cliff in the discharge curve, sampled voltage does not gradually decrease, but instead remains constant and then falls dramatically when the battery is depleted. With a steep discharge curve, predicting and/or estimating battery life is difficult because the sampled voltage does not signify approaching battery depletion until it is too late, i.e., until the battery is depleted or substantially depleted.

Using a battery 102 with a gradual discharge curve, as may be available with many lithium ion batteries, facilitates prediction and estimation of battery life, reporting of battery life, and can even facilitate measure to prolong battery life, e.g., by decreasing sensor sampling rate and/or heartbeat rate as described herein below.

Several approaches may be employed for power management. These approaches may be applied in varying degrees and independently of each other depending on specific application requirements.

In general, a Lynkd Device may default to, and remain in, a sleeping and/or low power mode, and may come out of such low power mode only as necessary and only for as long as necessary. For example, in an application where an elderly person wears or carries a Lynkd Device configured such that button 126 acts as an alert or help button, the Lynkd Device may remain in a low power mode, with sensors and communication radios and hardware turned off, until the Lynkd Device determines that button 126 has been pressed. Upon such determination, the Lynkd Device may transmit a notification to an external device, and may then immediately return to a low power mode, and/or may activate a WiFi for responsive information or communications.

In one embodiment, sensors in sensor system may employ decreased sampling rates and/or customized sampling schedules to economize power consumption. For example, sensors may decrease sampling rate based on the minimum sampling rate necessary to collect significant information, or based on the time of day, or based on configuration, or based on input from other sensors or other inputs. For example, a change in lighting detecting by a light sensor may trigger the motion sensor or the microphone. Additionally, sensors that are not being used may never sample. Many different sensor sampling approaches may be employed based on application, other inputs, battery life, configuration parameters; and any other factor that may allow for decreased sampling rates and/or sampling patterns.

In another embodiment, communication radios and hardware in communication system 160 may remain in an inactive state, i.e., neither transmitting, nor receiving, nor even sampling for transmissions to be received. Lynkd Device 100 may be configured to activate one or more components of communication system 160 only when necessary to transmit information, or when a received is expected to be received, or on a cyclical or patterned schedule to check for data transmissions or configuration information. Because communication radios, transmitters, antennas, and other such device consume significant power, avoiding unnecessary, and minimizing other uses, results in significant power savings.

Another embodiment may employ a "heartbeat" approach for receiving data and configuration information and for communicating with one or more external devices. In one approach, a Lynkd Device may periodically, or upon a predefined schedule, or upon direction from processor 151, send out a heartbeat transmission to an external communication device, e.g., a router. The heartbeat communication may report status to the external communication device (e.g., remaining battery life) and may also elicit any data or configuration that the external communication device may have for the Lynkd Device. For example, of the external communication device received or generated configuration information (e.g., activate sensor), it could not transmit such configuration information to the Lynkd Device if the Lynkd Device's WiFi system is de-activated. When the Lynkd Device's WiFi sensor is activated and sends a heartbeat to the external communication device, this transmission may indicate to the external communication device that the Lynkd Device's Wifi system is temporarily activated and listening for incoming transmissions. The external communication device may then determine to transmit stored, buffered, or queued data for the Lynkd Device.

Using these approaches, and any other power management approaches, may allow a Lynkd Device to function as a fully operational mini-computer, with processor, memory, non-volatile storage, interface elements, and sensors, but go without recharge for a year or more depending on particular circumstances.

In one embodiment, a Lynkd Device may conserve power by activating communication radios and/or other hardware or components only to send out notifications or data, but not to perform heartbeats.

Recharging

Recharging technologies are well known in the art. In one embodiment, a Lynkd Device may use a USB miniport interface for charging battery 102. Many other hardware approaches, most of which require a two-wire connection with a battery, could be used. PCB 150 may include circuitry to allow for charging battery 102 from the USB port associated with wired communication system 166.

Extensibility

In one embodiment, Lynkd Device 100 may be extensible and/or stackable. Many technologies and/or protocols may be employed to implement extensibility, including both publicly available and/or proprietary. In one embodiment, the I$^2$C communication protocol may be implement over USB hardware in communication system 160.

FIGS. 12a and 12h illustrate how male USB connectors 430a-b may be used for connecting Lynkd Device 100 to one or more extension devices (as described herein below), e.g., siren extension device 310 and moisture sensor extension device 420. USB hardware 430a-b and 431a-b (not visible) allows for a communication connection, e.g. I$^2$C, and also provides some mechanical/structural support for connecting the devices.

It should be appreciated that, depending on configuration and features of a Lynkd Device and or extension devices, and also the "stacking adapters," Lynked Devices and extension devices could also be stacked like pancakes (i.e., so that the flat faces are adjacent) or in many other ways.

In general, an extension device 300 may be any device that adds additional functionality to Lynkd Device 100. For example, extension device 300 may include, but is not limited to, one or more of the following: moisture sensor, humidity sensor, camera, video camera, or any other sensor known in the art. Although a sensor in extension device 300 is housed in a distinct hardware component, i.e., an extension device 300, it may communicate with PCB 150 through wired communication system 166 such that a sensor in extension device 300 has the same functionality as if it were a component of sensor system 140.

Figure 9:
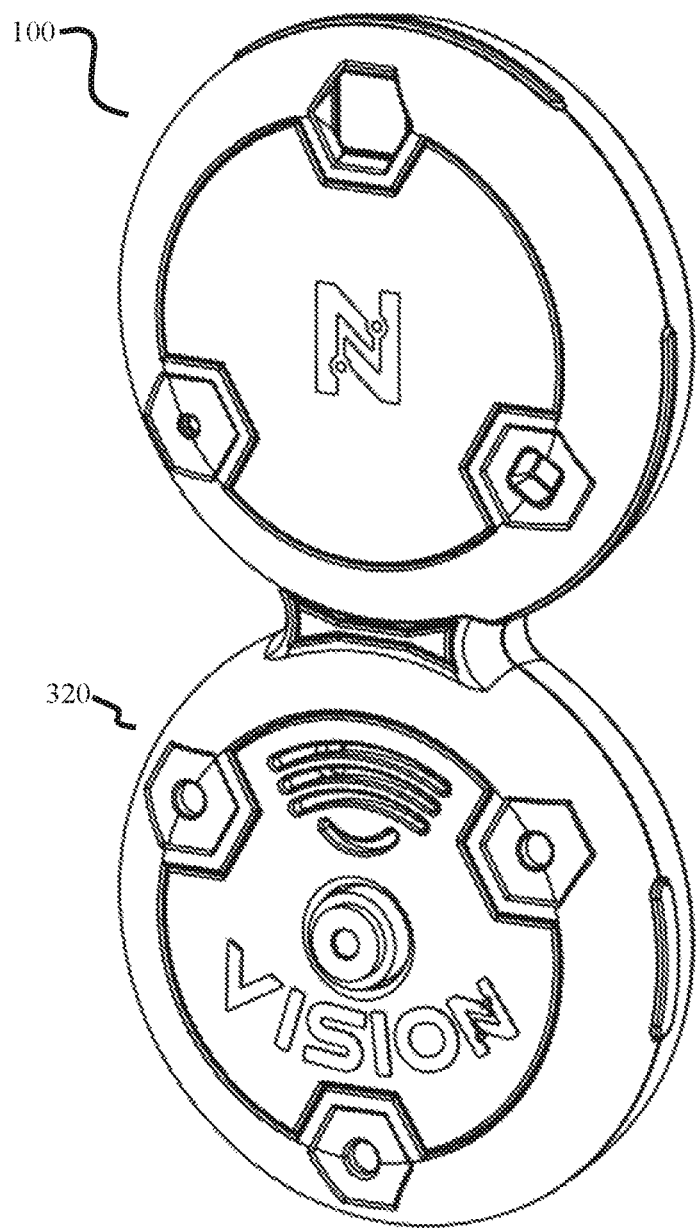
FIG. 9 shows an exemplary camera/video extension device.
Figure 10:
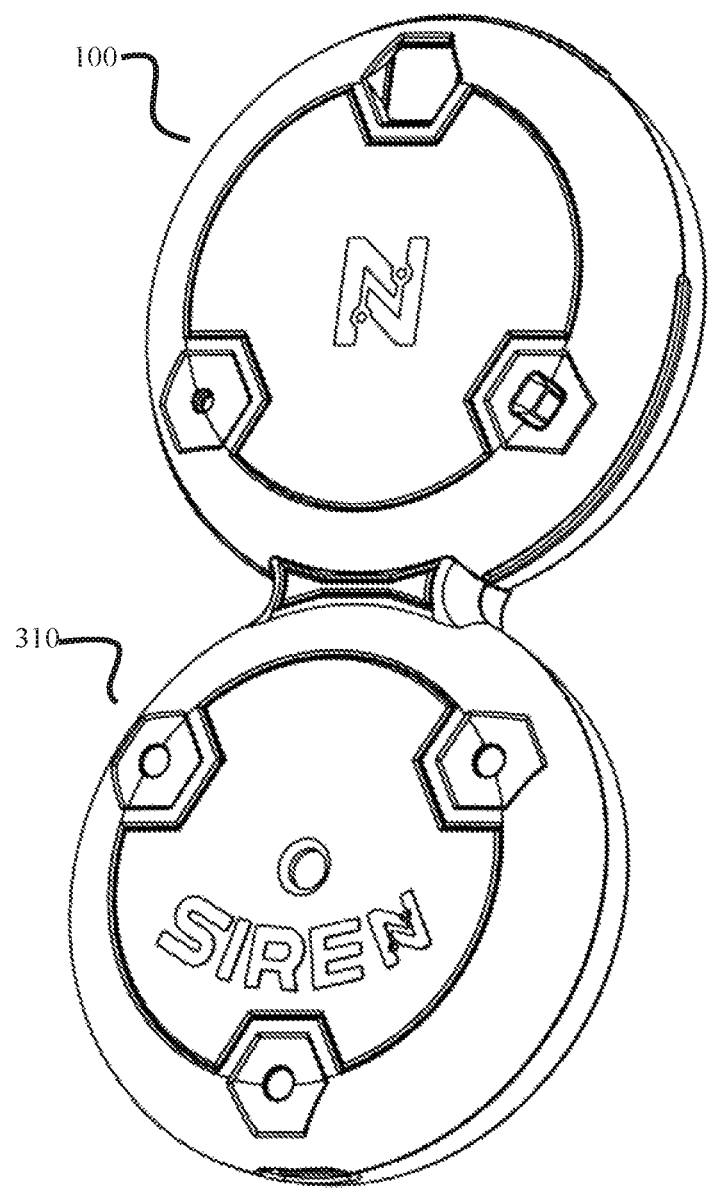
FIG. 10 shows air exemplary siren extension device.
Figure 11:
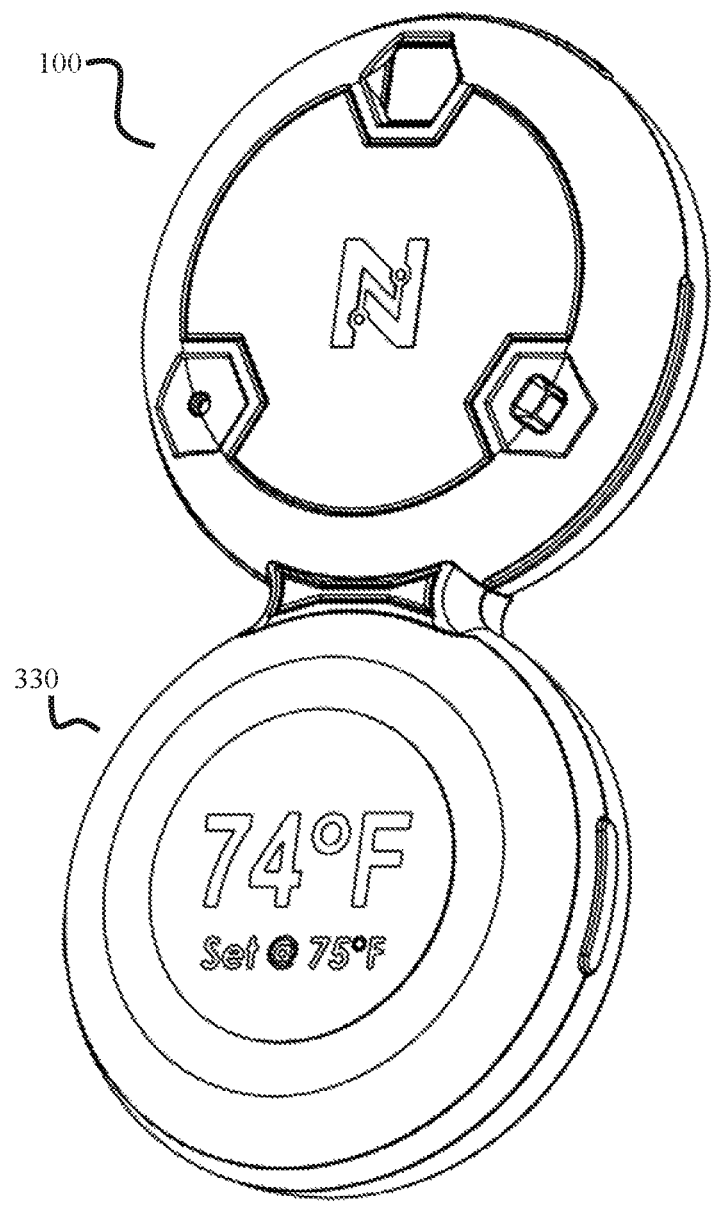
FIG. 11 shows an exemplary temperature display extension device.

FIGS. 9-12b illustrated exemplary extension devices connected to a Lynkd Device. FIG. 9 shows a camera/video extension device 320 connected to Lynkd Device 100. FIG. 10 shows a siren extension device 310, which may make a loud siren noise based on particular inputs or criteria, connected to Lynkd Device 100. FIG. 1 shows a temperature display extension device 330 connected to Lynkd Device 100. FIG. 12 shows a moisture sensor extension device 420 connected to siren extension device 310, which is in turn connected to Lynkd Device 100.

For example, moisture sensor extension device 420, as shown in FIGS. 12a and 12b, may be used to determine if a dry area, i.e., an area that should be dry, has water. Moisture sensor extension device 420 may be placed on the floor near, e.g., a water heater. If the water heater breaks and water gets out and begins to flood such that it reaches moisture sensor extension device 420, then moisture sensor extension device 420 may communicate, through its I$^2$C communication system, a notification, through PCB 150 in Lynkd Device 100, to an external device that there is water. In general, an extension device may be similar to a Lynkd Device, having a PCB, a communication system, an interface system, and/or a sensor system.

A humidity sensor extension device may function analogously to the moisture sensor extension device 420 described above.

In one embodiment, extension device 300 may include a camera, as is shown by camera/video extension device 320 in FIG. 9. Many small cameras, suitable for installation in a small device such as extension device 300, are known in the art. The camera in camera/video extension device 320 may be controlled by PCB 150 in Lynkd Device 100, which may direct the camera to take pictures at particular points in time and with particular characteristics or settings. In some embodiments, camera/video extension device 320 may include local data storage, and may store some images or video for later transmittal to Lynkd. Device 100. At some point, either immediately upon taking the picture, or at some point after the picture has been taken, camera/video extension device 320 may transmit the image or video data over its communication system Lynkd Device 100, which may either store the image(s) on local data storage 154 or transmit the image(s) over communication system 160 to an external device.

Lynkd Device 100 may direct the camera/video extension device to capture pictures or videos at predetermined points in time, or upon occurrence of some event, e.g., user direction, or movement of Lynkd Device, or detection of noise, or any other event that may present a reason to get an image or video from an extension device.

Although some sensors and devices herein are described as being part of a Lynkd Device or an extension device, it should be appreciated that the grouping of sensors and devices included in a Lynkd Device may be changed or modified, and that the particular grouping of sensors and devices available in extension devices may also be changed or modified.

Figure 13:
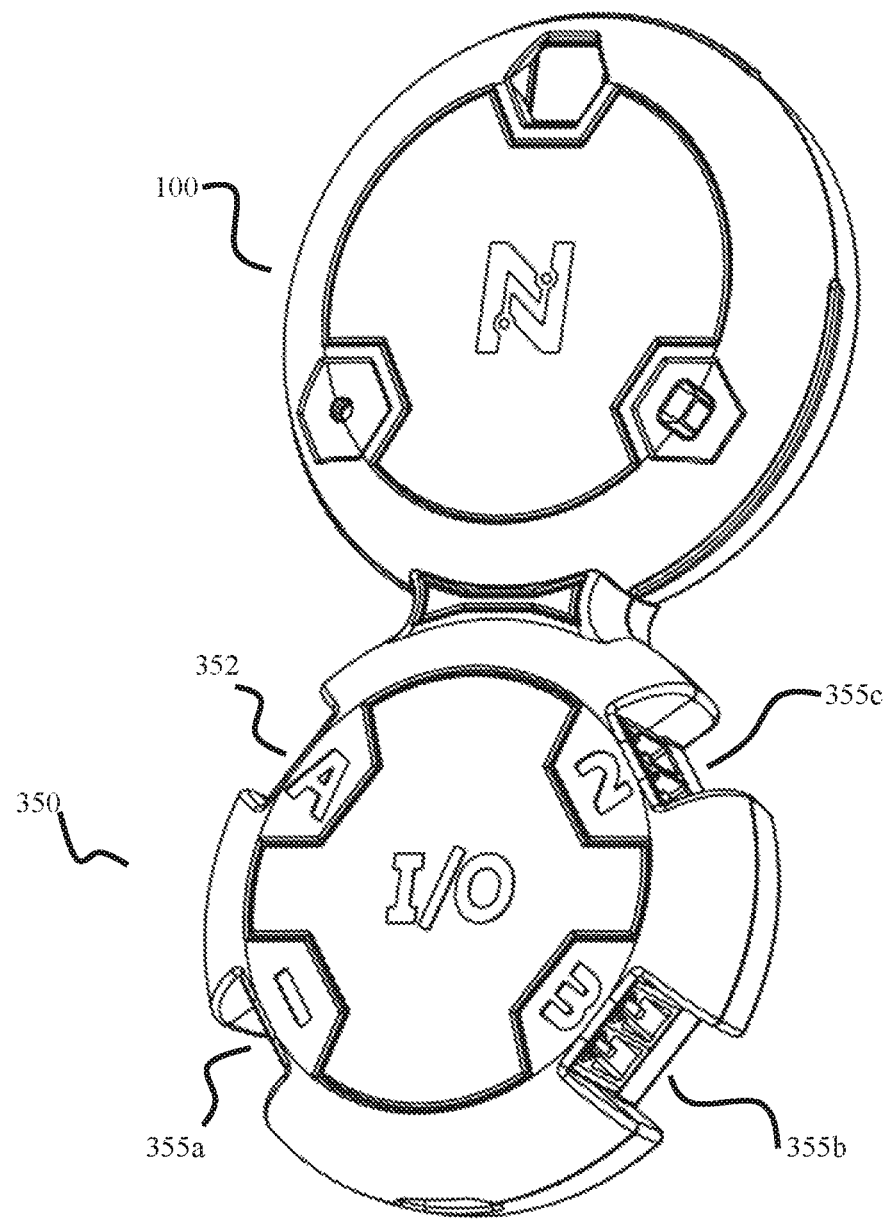
FIG. 13 shows an exemplary I/O extension device.

In one embodiment, an extension device 300 may be an input/output (I/O) device, and may additionally have one or more switches for controlling other powered devices such as a coffee maker, crock pot, heating/air-conditioning system, or any other powered device. FIG. 13 illustrates an exemplary I/O extension device 350 connected to Lynkd Device 100. As shown in FIG. 13, I/O device 350 includes input port 352 for receiving input from any source, and switches 355a-b, which are configured to act as power switches to turn a device off or on. Input 352, as well as switches 355a-c, could be incorporated into Lynkd Device 100, or into any extension device in different numbers of inputs and switches. Input port 352 could be any type of input port known in the art, e.g., USB, I$^2$C, or any other protocol or technology. Input port 352 may receive input from any external source, including from a source or device other than an Lynkd device or extension device. Switch 355n may be used to turn a device on or off. For example, Lynkd Device 100 could directed I/O device to activate switch 355a every morning at 6:30 am, and switch 355a could be the switch for a coffee maker. In another embodiment, switch 355b could be a switch for a water pump, and could be used to turn on a water pump when Lynkd Device 100 receives input or a notification that a water level is too high or that water has appeared. In general using an input port such as input port 352, and a switch such as switch 355a, allows a Lynkd Device to be very versatile, able to receive input from almost any source and, based on such input, control almost any device.

External Devices

As referenced herein, Lynkd Device 100 may communicate with one or more external devices, i.e., transmit and receive data to or from external devices. External devices may include, but are not limited to, a WiFi-enabled device (e.g., a WiFi router), a Bluetooth-enabled device, a USB-enabled device, an I²C-enabled device, a ZWave-enabled device, or any other device to configured to communicate over a communication protocol and/or technology that may be included in Lynkd Device 100.

Although Lynkd Device 100 may communicate with many different external devices, with varying features and functionality, two such external devices will be addressed herein in detail: Lynkd Server 700 and mobile device 750 (e.g., smartphone).

Figure 14:
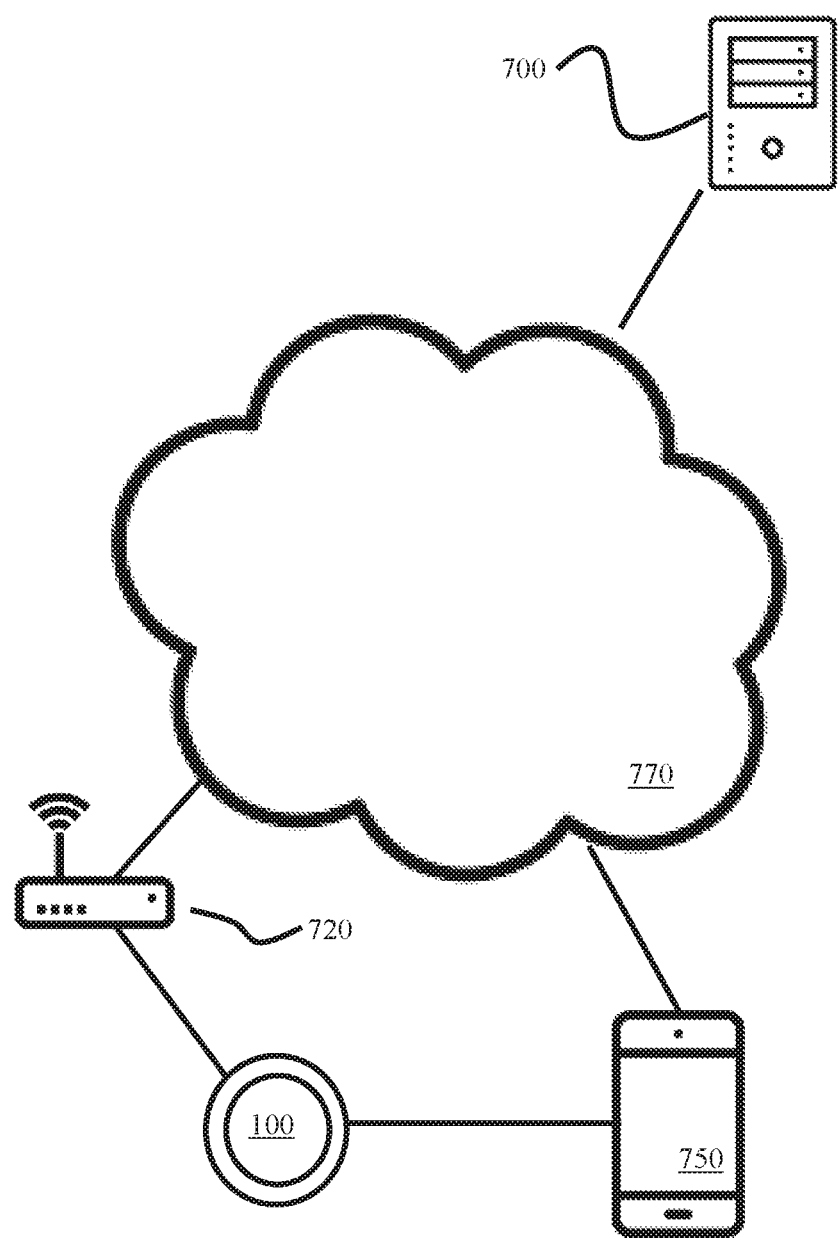
FIG. 14 shows an exemplary communication scheme for a Lynkd system.

FIG. 14 shows a one embodiment for a communication scheme whereby Lynkd Device 100, mobile device 750, and Lynkd Server 700 may communicate.

In one embodiment, Lynkd Server 700 is a server configured with computer readable instructions that, when processed, cause Lynkd Server 700 to do one or more of, or a combination of: elicit data from Lynkd Device 100, direct Lynkd. Device 100 to capture data, direct Lynkd Device 100 to make a noise, or show lights 128a-c, or vibrate, transmit configuration parameters to Lynkd Device 100, receive configuration parameters from Lynkd Device 100, and receive data from Lynkd Device.

Lynkd Server 700 may be an IP enabled server that transmits and receives data over an IP network. As is well known in the art, may communication and networking protocols and technologies could be implemented without materially departing from the spirit of the disclosure herein.

Because of the nature of the data this will generally be collected by a Lynkd Device 100 and associated extension devices, and also the sensitive and private nature of location and configuration of Lynkd Device 100 and associated extension devices, communication between Lynkd server 700 and Lynkd Device 100 is generally secure such that it is encrypted or otherwise kept private. As is known in the art, many techniques, protocols, and technologies may employed to secure data transmissions and communications, e.g., private key encryption, and HTTPS. A variety of technologies known in the art, or a combination of such, or a proprietary technique, may be employed to secure data communications between Lynkd Server 700 and Lynkd Device 100.

In one embodiment, Lynkd Server 700 may elicit data from Lynkd Device 100 vie Internet 770 and/or local WiFi router 720. For example, Lynkd Server 700 may request an image or video from camera/video extension device 320, or data from any sensor or extension device. Lynkd Server 700 may further request historical data from any sensor or extension device, or may direct Lynkd Device 100 to capture data, using a sensor or extension device, at a particular time in the future, or on a particular schedule, or with particular parameters (e.g., image or video at a specific resolution, or image or video in black and white or limited to a subset of colors, or noise volume but not content, etc.)

Similar to eliciting data from Lynkd Device 100, Lynkd Server 700 may receive data from Lynkd Device 100 via local WiFi router 720 and Internet 770. Such received data may either be elicited data, or data that Lynkd Device 100 provides without elicitation.

Similarly, Lynkd Server 700 may direct Lynkd Device 100 to capture data and store such data in local storage, e.g., local data storage 154.

Lynkd Server 700 may also transmit data to Lynkd Device 100 comprising a direction to make noise (e.g., an alarm) or show or blink one or more of lights 128a-c, to vibrate, or deactivate one or more sensors or extension devices.

Lynkd Server 700 may also transmit data to Lynkd Device 100 comprising a direction to transmit some or all configuration parameters for Lynkd Device 100 and/or some or all of the sensors and/or extension devices. Such parameters, may include, but are not limited to, battery life, battery consumption rate, projected battery expiration, identification of sensors on Lynkd. Device 100, identification and status of all connected extension devices and associated sensors, summary of data stored on Lynkd Device 100 and not yet transmitted to Lynkd Server 700, capture or sampling schedule(s) for sensors on Lynkd Device and sensors on connected extension devices, location of Lynkd Device 100, identification of WiFi routers within range of Lynkd Device 100, identification of users authorized to configure Lynkd Device 100, and any other configuration parameter or information that may be relevant to Lynkd Device 100 or connected extension devices.

For example, configuration parameters may be specific to particular sensors and/or applications. In one embodiment, a Lynkd Device may be secured to a residential window for detecting when the window opens and closes. In this application, Lynkd Device 100 may be configured with a threshold movement amount, i.e., a distance movement or location that indicates a closed configuration, or a partially closed configuration, or an open configuration, etc. As will be appreciated by a person of ordinary skill in the art, depending on particular characteristics of applications and or environments, sensor and extension device sensors may have many different configuration parameters to define, e.g., normal, allowable conditions, and abnormal conditions requiring action such as an alarm or a notification to Lynkd Server 700.

Lynkd Server 700 may also transmit data to Lynkd Device 100 comprising a direction to set some or all configuration parameters for Lynkd Device 100, as described herein above.

In addition to transmitting data to and receiving data from Lynkd Device 100, Lynkd Server 700 may further be configured to take actions based on the state of Lynkd Device 100. For example, as described herein above, Lynkd Server 700 may comprise an "external device" that may receive notifications from Lynkd Device 700 of certain conditions that have occurred or been measured by Lynkd. Device 100. For example, a Lynkd Device 100 may be secured to a window and configured to determine when the window changes from a closed state or configuration to an open state or configuration. Lynkd Server may be configured with a schedule showing that, at a particular time, nobody is home and the window to which Lynkd Device 100 is secured should remain closed. If the window is opened, Lynkd Device may transmit a notification to Lynkd Server 700 that the Lynkd Device associated with the window at issue (each Lynkd Device is associated with a unique identifier) has notified of a movement to the open state. Based on this notification, Lynkd Server may do one or more of the following: Direct the Lynkd Device to make noise, i.e., an alarm; notify an associate owner, user, or administrator of the open window via text message, phone call, or email; notify local law enforcement authorities of a potential break-in; notify a trusted neighbor of a potential break-in; or any other action as may be appropriate for a response to an unauthorized opening of a window.

Based on the various notifications that Lynkd Server 700 may receive from Lynkd Device 100, Lynkd Server 700 may take appropriate action as will be appreciated by a person of ordinary skill in the art.

Lynkd Server 700 may further be configured to interface with a user, owner, and/or administrator associated with a Lynkd Device 100. For example, Lynkd Server 100 may provide to a user, owner, or administrator associated with the property being secured by one or more Lynkd. Devices an interface for checking configuration parameters, setting configuration parameters, receiving and/or viewing data from Lynkd Devices, receiving notifications, and or taking action based on notifications or other information received from Lynkd Server 700 for one or more Lynkd Devices for which a user is associated or otherwise responsible. A user, owner, or administrator will hereinafter be referred to as a "user."

In one embodiment, Lynkd Server 700 may provide this information, and an interface for inputting information as described above, through, e.g., a web interface or a mobile device app interface on mobile device 750. Such interfaces, as well as the associated controls, components, and interface and input elements, are well-known in the art. This interface may be referred to as a "User Interface," The User Interface may be secured, e.g., by required a secured communication technology protocol (e.g., HTTPS, or private key encryption, and/or other such technology to keep information private) and by requiring authentication (e.g., user name and password) for a user to access information and/or input information.

The User Interface may provide to a user all information and/or data stored on Lynkd Server 700 and/or a set of Lynkd Devices, and may also provide input elements for a user to enter configuration information for Lynkd Server 700 and/or a set of Lynkd Devices.

In one embodiment, a user may group a set of Lynkd Devices 800 to form a Lynkd. Devices set 800 that are logically related. For example, a user may group a set of Lynkd Devices into a "primary residence" set, i.e., a set of Lynkd Devices associated with the user's home. This set of Lynkd Devices, which may hereinafter be referred to as the "Home Lynkd Devices," may comprises Lynkd Devices installed on one or more windows, one or more doors, on the outside in locations where views of porches and exterior doors are accessible, in a utility room for sensing water. These installations are, of course, representative, and a user could install Lynkd Devices in many different configurations and in many different locations and on many different items inside or near a house.

In a preferred embodiment, the user may have, in the home associated with the Home Lynkd Devices, a local wireless (WiFi) router 720 or routers (a wireless network) configured to securely communicate with the Home Lynkd Devices.

Using the User Interface, the user may configure the Home Lynkd Devices and may also receive data from the Home Lynkd Devices and/or Lynkd Server 700. The user may configure Home Lynkd Devices by identifying, for each Home Lynkd Device or for subsets of Home Lynkd Devices, names, locations, primary uses, connected extension devices, and configuration parameters specific to a particular Lynkd Device, such as a schedule on which the Lynkd Device expects to be in a particular state such as closed or open, or actions to take on abnormal conditions (alarm, vibrate, notify Lynkd Server 700, notify Lynkd Server 700 and further notify user), frequency of data sampling (e.g., taking pictures or videos), and all other parameters necessary for or related to administering or managing the Home Lynkd Devices.

In addition to administering or managing the Home Lynkd Devices through the User Interface provided through Lynkd Server 700, a user may additionally manage his or her Lynkd Devices through over a short-range communication technology such as Bluetooth. In this manner, when a user is near a Lynkd Device, the user may use a mobile device app, or an interface on any other Bluetooth-enabled device, to configure one or more Lynkd Devices. The Bluetooth management approach has, in general, the same functionality as management via Lynkd Server 700, with the exception of limitations resulting from the limited range of Bluetooth.

In addition to managing Lynkd Devices, when within Bluetooth range, Bluetooth management may be used for initial management and configuration for a Lynkd Device is first installed.

What is claimed is:

1. A battery-powered monitoring device and extension device, wherein:
 the battery-powered monitoring device comprises:
  a first processor;
  first instructions executable on the first processor;
  a first rechargeable battery;
  a first local data storage;
  a first set of one or more sensors for sensing first environment data surrounding the battery-powered monitoring device;
  a first wireless communication system; and
  a first hardware structural port for data input, data output, and battery charging, wherein the first hardware structural port is configured to directly receive and structurally support the extension device;
 the extension device includes at least one component chosen from a sensor and an interface element for sensing second environment data surrounding the extension device;
 the extension device includes a second hardware structural port for data output; and
 the extension device is secured and directly coupled to the battery-powered monitoring device at least in part by the first hardware structural port and by the second hardware structural port.

2. The battery-powered monitoring extension device of claim 1, comprising at least two sensors from a motion sensor, light sensor, sound sensor, accelerometer, and temperature sensor.

3. The extension device of claim 1, wherein the extension device has substantially same shape, size, and functionality as the battery-powered monitoring device.

4. The battery-powered monitoring device and extension device of claim 1, wherein the wireless communication system includes wireless.

5. The battery-powered monitoring device and extension device of claim 1, wherein:
 the extension device further includes a third hardware structural port for directly receiving and structurally supporting a potential second extension device of similar functionalities as the battery-powered monitoring or the extension device; and the battery-powered monitoring device is configured to:
receive, from the extension device and through the first hardware structural port, the sensed second environment data to communicate to external devices using the first wireless communication system; and when the extension device is directly coupled to the potential second extension device, receive from the potential second extension device through the extension device via the first hardware structural port, third environment data sensed from the potential second extension device, and communicate to the external devices the sensed third environment data using the first wireless communication system.

6. The battery-powered monitoring device of claim 1, further comprising a switch interface.

7. The battery-powered monitoring device and extension device of claim 1, wherein the extension device includes one or more switch interfaces.

8. The battery-powered monitoring device and extension device of claim 1, wherein:
the instructions executable on the processor activate the one or more sensors for data collection according to a power conservation scheme; and
the power conservation scheme comprises a scheme chosen from:
activating the one or more sensors based upon a button press;
decreasing sampling rates for at least one of the one or more sensors for data collection; and
increasing sampling rates for at least one of the one or more sensors for data collection based at least in part on data from the one or more sensors.

9. The battery-powered monitoring device and extension device of claim 1, wherein:
the instructions executable on the processor manage the wireless communication system according to a power conservation scheme; and
the power conservation scheme comprises a scheme chosen from:
periodically transmitting a heartbeat communication or status communication to an external communication device; and
periodically temporarily activating a receive capability to listen for incoming transmissions.

10. The battery-powered monitoring device and extension device of claim 1, wherein the instructions executable on the processor further:
cause the wireless communication system to send a periodic heartbeat to a server; and
temporarily activate, for a limited time after sending the periodic heartbeat, the wireless communication system to listen for incoming transmissions.

11. The battery-powered monitoring device and extension device of claim 1, wherein:

no dimension of the battery-powered monitoring device is greater than 1.5 inches; and
no dimension of the extension device is greater than 1.5 inches.

12. A monitoring system, comprising:
at least two battery-powered monitoring device systems; and
a monitoring server; wherein:
the at least two battery-powered monitoring devices are configured to communicate directly with the monitoring server;
the monitoring server is configured to communicate directly with the at least two battery-powered monitoring devices; and
each of the at least two battery-powered monitoring device systems comprises a battery-powered monitoring device and an extension device, and wherein the battery-powered monitoring device comprises:
a first processor;
first instructions executable on the first processor;
a first rechargeable battery;
a first local data storage;
a first set of one or more sensors for sensing, first environment data surrounding the battery-powered monitoring device;
a first wireless communication system; and
a first hardware structural port for data input, data output, and battery charging, wherein the first hardware structural port is configured to directly receive and structurally support the extension device; and
the extension device includes at least one component chosen from a sensor and an interface element for sensing second environment data surrounding the extension device;
the extension device includes a second hardware structural port for data output; and
the extension device is secured and directly coupled to the battery-powered monitoring device at least in part by the first hardware structural port and by the second hardware structural port.

13. The monitoring system of claim 12, wherein each of the at least two battery-powered monitoring devices includes a Bluetooth system for configuration.

14. The monitoring system of claim 12, wherein the monitoring server is configured to receive configuration information for the at least two battery-powered monitoring devices and to transmit such configuration information to the at least two battery-powered monitoring devices.

15. The monitoring system of claim 12, wherein the monitoring server is configured to receive a notification from one of the at least two battery-powered monitoring devices.

16. The monitoring system of claim 12, wherein at least one of the battery-powered monitoring devices is configured to transmit a heartbeat to request data.

* * * * *